(12) United States Patent
Finnerty et al.

(10) Patent No.: US 8,309,270 B2
(45) Date of Patent: Nov. 13, 2012

(54) SOLID OXIDE FUEL CELL SYSTEMS WITH IMPROVED GAS CHANNELING AND HEAT EXCHANGE

(75) Inventors: Caine Finnerty, Buffalo, NY (US); Charles Robinson, Lawtons, NY (US)

(73) Assignee: CP SOFC IP, LLC, Ann Arbor, MI (US)

( * ) Notice: Subject to any disclaimer, the term of this patent is extended or adjusted under 35 U.S.C. 154(b) by 1442 days.

(21) Appl. No.: 11/890,292

(22) Filed: Aug. 3, 2007

(65) Prior Publication Data

US 2009/0035620 A1    Feb. 5, 2009

(51) Int. Cl.
*H01M 8/24* (2006.01)
*H01M 8/10* (2006.01)
*H01M 8/00* (2006.01)

(52) U.S. Cl. ......... 429/497; 429/452; 429/465; 429/466

(58) Field of Classification Search ............ 429/425
See application file for complete search history.

(56) References Cited

U.S. PATENT DOCUMENTS

| | | |
|---|---|---|
| 4,510,212 A | 4/1985 | Fraioli |
| 4,640,875 A | 2/1987 | Makiel |
| 4,774,153 A | 9/1988 | Sterzel |
| 5,103,871 A | 4/1992 | Misawa et al. |
| 5,273,837 A | 12/1993 | Aitken et al. |
| 5,273,839 A | 12/1993 | Ishihara et al. |
| 5,733,675 A | 3/1998 | Dederer et al. |
| 5,856,035 A | 1/1999 | Khandkar et al. |
| 6,379,485 B1 | 4/2002 | Borglum |
| 6,485,852 B1 | 11/2002 | Miller et al. |
| 6,569,553 B1 | 5/2003 | Koripella et al. |
| 6,630,267 B2 | 10/2003 | Badding et al. |
| 6,699,609 B2 | 3/2004 | Kotani et al. |
| 6,793,698 B1 | 9/2004 | Sanger et al. |
| 7,014,942 B2 | 3/2006 | Gorte et al. |
| 2003/0054215 A1* | 3/2003 | Doshi et al. ............ 429/26 |
| 2004/0023101 A1 | 2/2004 | Jacobson et al. |
| 2005/0019578 A1* | 1/2005 | Bosteels ............ 428/408 |
| 2005/0031923 A1 | 2/2005 | Kuroishi |
| 2005/0042490 A1 | 2/2005 | Finnerty |
| 2005/0181253 A1 | 8/2005 | Finnerty |
| 2005/0271931 A1 | 12/2005 | Finnerty |
| 2006/0013762 A1* | 1/2006 | Kuipers et al. ............ 423/651 |
| 2006/0051642 A1 | 3/2006 | Finnerty |

(Continued)

FOREIGN PATENT DOCUMENTS

EP    0 264 688 A1    4/1988

(Continued)

OTHER PUBLICATIONS

International Search Report from the International Searching Authority for International Application No. PCT/US2007/017405, mailed Apr. 17, 2008, 8 pages.

(Continued)

*Primary Examiner* — Raymond Alejandro
*Assistant Examiner* — Steven Scully
(74) *Attorney, Agent, or Firm* — Burns & Levinson LLP

(57) ABSTRACT

The present teachings relate to solid oxide fuel cell systems featuring a novel design that provides improved thermal management of the system. The solid oxide fuel cell systems disclosed include gas channeling features that regulate the temperature of local areas of the system and protect thermal-sensitive current collection elements.

18 Claims, 4 Drawing Sheets

U.S. PATENT DOCUMENTS

| | | |
|---|---|---|
| 2006/0275647 A1 | 12/2006 | Finnerty |
| 2008/0292918 A1 | 11/2008 | Finnerty |
| 2009/0023050 A1 | 1/2009 | Finnerty |

FOREIGN PATENT DOCUMENTS

| | | |
|---|---|---|
| EP | 0450336 * | 10/1991 |
| WO | WO 97/18597 | 5/1997 |
| WO | WO 99/17390 | 4/1999 |
| WO | 00/26983 | 5/2000 |
| WO | WO 03/041190 A2 | 5/2003 |
| WO | WO 2006/097663 | 9/2006 |

OTHER PUBLICATIONS

Written Opinion of the International Searching Authority from the International Searching Authority for International Application No. PCT/US2007/017405, mailed Apr. 17, 2008, 10 pages.

EG&G Services, Parson, Inc., SAIC, Fuel Cell Handbook, $5^{th}$ edition, 2000, pp. 8-1 to 8-24, U.S. Department of Energy, USA.

* cited by examiner

SOLID OXIDE FUEL CELL SYSTEMS WITH IMPROVED GAS CHANNELING AND HEAT EXCHANGE

The present teachings relate to fuel cell systems and devices, and specifically to fuel cell systems and devices having improved gas channeling and temperature regulation.

A fuel cell is an electrical device which converts the potential energy of fuel to electricity through an electrochemical reaction. In general, a fuel cell includes a pair of electrodes separated by an electrolyte. The electrolyte only allows passage of certain types of ions. The selective passage of ions across the electrolyte generates an electrical potential between the two electrodes, which can be harnessed in the form of electrical power. To increase the power output, multiple fuel cells can be included in a fuel cell system. For example, multiple fuel cells can be grouped together into a fuel cell stack.

Among different types of fuel cells known in the art, fuel cells that operate at a higher temperature (e.g., solid oxide fuel cells and molten carbonate fuel cells) tend to offer higher fuel-to-electricity efficiencies than low-temperature fuel cells (e.g., phosphoric acid fuel cells and proton exchange membrane fuel cells). Solid oxide fuel cells (SOFCs) and molten carbonate fuel cells (MCFCs) make use of an oxygen ion-conducting electrolyte and a carbonate ion-conducting electrolyte, respectively, and operate at temperatures above 500° C. To achieve such high operating temperatures and to eliminate prolonged startup time, these high-temperature fuel cell systems require designs that can enable effective thermal regulation.

In addition, fuel cell systems that include reformers pose particular challenges for regulating their temperatures. Endothermic reforming (e.g., steam reforming) of hydrocarbon fuels often needs to take place at high temperatures, while exothermic reforming (e.g., partial oxidation reforming) reactions can release excessive heat that if not properly regulated can destroy the reforming catalysts and/or other components of the fuel cell systems. Current collection devices, i.e., devices that collect the current created by the electrochemical reaction in the fuel cell system, are particularly susceptible to heat damage because they are often made of metals that melt at relatively low temperatures (e.g., silver).

Therefore, a need exists for fuel cell systems that are designed to provide improved thermal regulation, which would permit the fuel cell system to operate at increased efficiency.

SUMMARY

In light of the foregoing, the present teachings provide solid oxide fuel cell systems that include one or more fuel cells and a central support element that is in fluid communication with each of the one or more fuel cells. Each of the one or more fuel cells includes an anode, a cathode, and an electrolyte. In some embodiments, the central support element can include an inner longitudinal element and an outer longitudinal element, where the outer longitudinal element can be concentric to and disposed around the inner longitudinal element. The inner longitudinal element can define an inner longitudinal channel which is adapted to deliver a fuel to the anode of each of the one or more fuel cells. The outer longitudinal element can define an outer longitudinal channel which is adapted to deliver an oxidant to the cathode of each of the one or more fuel cells. In some embodiments, the one or more fuel cells can be disposed around the central support element.

In some embodiments, the central support element can include one or more catalysts. For example, the one or more catalysts can be coated on or associated with at least a portion of an inner surface of the inner longitudinal element of the central support element. The one or more catalysts can be a reforming catalyst (e.g., a partial oxidation reforming catalyst and/or a steam reforming catalyst) a combustion catalyst, and/or combinations thereof. In some embodiments, the catalyst can be a staged catalyst. For example, the staged catalyst can include a staged mixture of a partial oxidation catalyst, a combination partial oxidation and combustion catalyst, a combustion catalyst, and a steam reforming catalyst.

In some embodiments, the fuel cell systems can include one or more anode outlet flow channels as well as one or more cathode flow channels. The one or more anode outlet flow channels can be in fluid communication with the one or more anodes and adapted to direct an anode exhaust from the one or more anodes. The one or more cathode outlet flow channels can be in fluid communication with the one or more cathodes and adapted to direct a cathode exhaust from the one or more cathodes. The fuel cell systems can include a reducing chamber that is in fluid communication with the one or more anode outlet flow channels and is substantially free of any oxidant. The fuel cell systems also can include one or more current collectors disposed within the reducing chamber that is in electrical communication with each of the one or more fuel cells. The fuel cell systems can further include an after burner that is in fluid communication with the reducing chamber as well as the one or more cathode outlet flow channels. The after burner can be adapted to allow the combination of the anode exhaust from the one or more anodes and the cathode exhaust from the one or more cathodes.

In some embodiments, the reducing chamber can be in thermal communication with an insulating material. For example, the insulating material can be present between the reducing chamber and the after burner. In certain embodiments, the after burner can include an inner surface that is at least partially coated with a combustion catalyst. The reducing chamber and/or the after burner can be disposed around the central support element.

Another aspect of the present teachings relates to a method of operating a fuel cell system, for example, a fuel cell system similar to the various embodiments described above. In some embodiments, the fuel cell system can include one or more fuel cells, a central support element in fluid communication with the one or more fuel cells, and a current collector in electrical communication with the one or more fuel cells. The current collector can be disposed around the central support element. The central support element can include an inner longitudinal element defining an inner longitudinal channel and an outer longitudinal element defining an outer longitudinal channel. The outer longitudinal element can be concentric to and disposed around the inner longitudinal element.

The operating method of the fuel cell system can include directing a fuel through the inner longitudinal element to an anode of the one or more fuel cells, and directing an oxidant through the outer longitudinal element to a cathode of the one or more fuel cells. The temperature difference between the inner longitudinal element and the temperature of the outer longitudinal element at various stages of operation of the fuel cell system can create a temperature differential. This temperature differential can facilitate heat transfer and help regulate the local temperature in the central support element as well as the overall temperature of the entire fuel cell system.

In some embodiments, by directing the oxidant through the outer longitudinal channel, the current collector can be protected from exposure to excessive heat. In some embodiments, the fuel cell system can include a reducing chamber, in which one or more current collectors can be disposed. The reducing chamber can be in fluid communication with an after burner. In these embodiments, the method of the present teachings can further include directing an anode exhaust from the anode of the one or more fuel cells to the reducing chamber, directing a cathode exhaust from the cathode of the one or more fuel cells to the after burner, directing the unreacted fuel from the reducing chamber to the after burner, and combining the unreacted fuel and the unreacted oxidant in the after burner. In certain embodiments, the method can include combusting the anode exhaust and the cathode exhaust in the after burner and/or providing an insulating material between the reducing chamber and the after burner.

BRIEF DESCRIPTION OF THE DRAWINGS

It should be understood that the drawings are not necessarily to scale, with emphasis generally being placed upon illustrating the principles of the present teachings. The drawings are not intended to limit the scope of the present teachings in any way.

DETAILED DESCRIPTION OF THE PRESENT TEACHINGS

The present teachings, in part, provide a fuel cell system having increased efficiency through improved temperature regulation and current collection. The temperature of the fuel cell system can be regulated and the current collection can be improved by providing gas channeling features that transfer intake and exhaust gases efficiently and effectively through the fuel cell system. More specifically, the present teachings provide a solid oxide fuel cell system having a central support element in fluid communication with an insulated reducing chamber and an after burner. The novel gas channeling of different temperature gases in close proximity to one another can facilitate heat transfer and temperature regulation. Additionally, the channeling of only reducing gases into a reducing chamber, which houses the current collector, and limiting direct combustion near the current collector increases current collection efficiency.

Throughout the description, where devices or compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited processing steps. It should be understood that the order of steps or order for performing certain actions is immaterial so long as the method remains operable. Moreover, two or more steps or actions can be conducted simultaneously.

In the application, where an element or component is said to be included in and/or selected from a list of recited elements or components, it should be understood that the element or component can be any one of the recited elements or components and can be selected from two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise.

Figure 1:
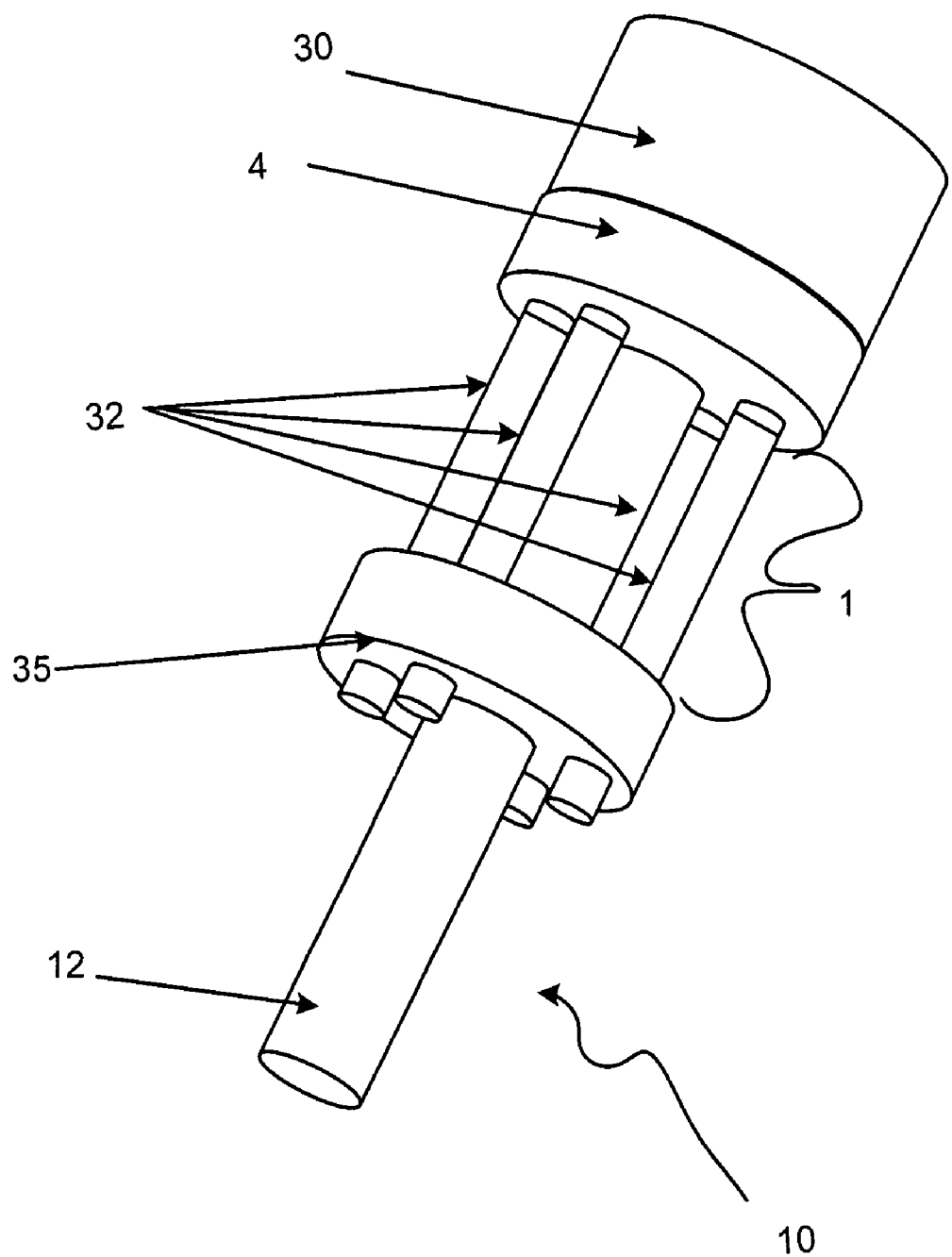
FIG. 1 is a schematic perspective view of an embodiment of a solid oxide fuel cell of the present teachings.

In general, the present teachings relate to a solid oxide fuel cell system with improved gas channeling, temperature regulation and current collection. As shown in FIG. 1, the present teachings generally provide a fuel cell system 10 that includes a central support element 12 and a fuel cell stack 1 that is disposed about or around the central support element 12. The fuel cell stack can include one or more fuel cells 32. Generally, the fuel cell system 10 also includes a fuel cell plate 4, a current collection assembly 35, an after burner (not shown), and optionally, a manifold cap 30. The fuel cell plate can be made of alloy, metal or a ceramic material and can be dense or porous. Similarly, the after burner can be made of alloy, metal or a ceramic material and can be dense or porous.

In some embodiments, the one or more fuel cells can be removably or rigidly secured to the fuel cell plate at one end (i.e., the distal end) and the current collection assembly at the other end (i.e., the proximal end). Similar to the fuel cells, the distal end of the central support element can be removably or rigidly secured to the proximal side of the fuel cell plate. The fuel cell plate can be a disc or a plate of various geometric or irregular shapes that include multiple openings for passage or attachment of the central support tube and the one or more fuel cells. In some embodiments, the central support element can be in fluid communication with the one or more fuel cells via an optional manifold cap, which, if present, can be attached to the distal side of the fuel cell plate. Both the current collection assembly and the after burner can be disposed about the central support element, with the after burner being proximal to the current collection assembly.

In addition to introducing one or more fuels and oxidants to the fuel cells, the central support element can act as a reformer by including one or more reforming catalysts when hydrocarbon-containing fuels (e.g., propane) are used to fuel the fuel cells. The central support element can feature a dual-channel design that can increase the efficiency of the fuel cell system as a whole by providing improved thermal regulation and gas channeling throughout the fuel cell system.

The central support element can be joined to the fuel cell plate by physical, mechanical, and/or chemical means. In some embodiments, the connection between the central support element and the fuel cell plate can be a tight slip fit such that the central support element is held in place on the fuel cell plate by friction. In other embodiments, the central support element and the fuel cell plate can be bonded together using various adhesives known in the art. For example, a commercially available alumina bonding agent can be used.

Figure 2:
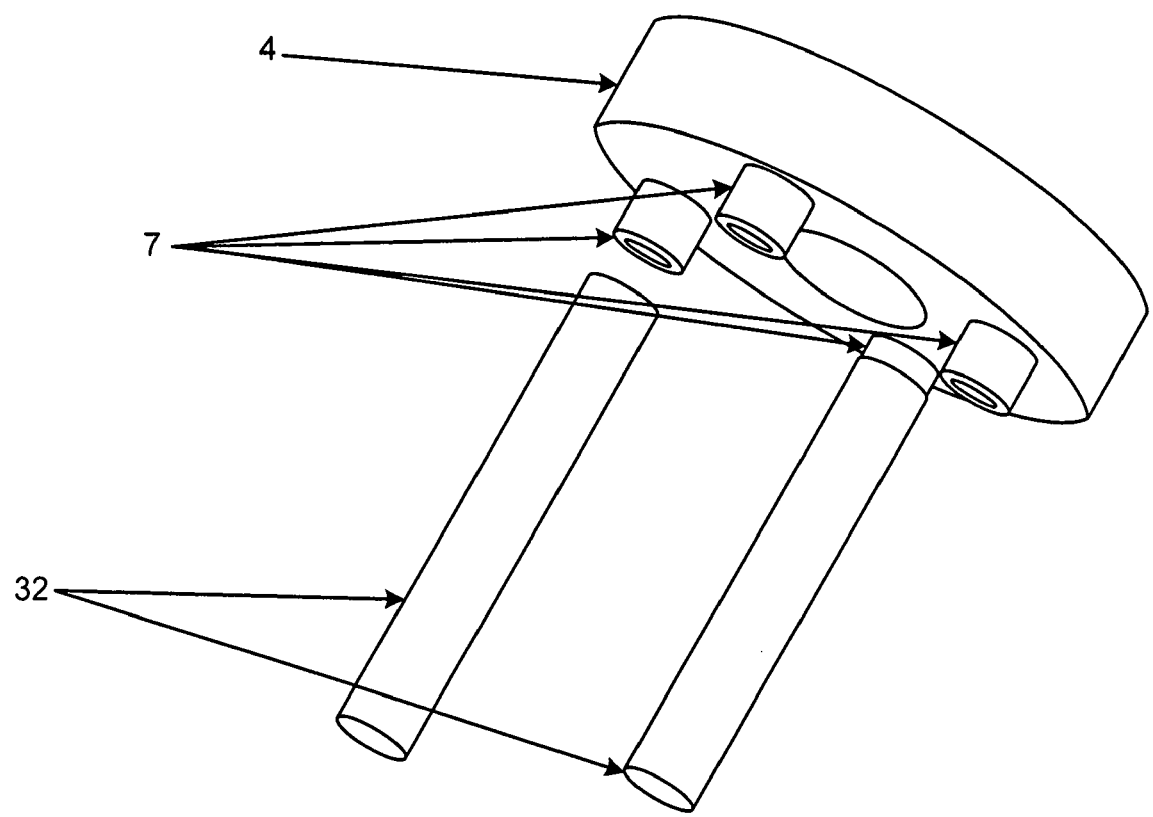
FIG. 2 is a schematic perspective view of an embodiment of a fuel cell stack according to the present teachings.

The one or more fuel cells can be similarly affixed to the fuel cell plate. For example, the one or more fuel cells can be mounted onto the fuel cell plate by inserting them into openings or cavities in the fuel cell plate. The diameter of these openings can be equal or slightly smaller than that of the fuel cells. In other embodiments, as shown in FIG. 2, the one or more fuel cells 32 can be mounted on protruding features, for example, injector pins 7, on the fuel cell plate 4. The injector pins 7 can be formed as integral features of the fuel cell plate 4 or manufactured separately and attached to the fuel cell plate 4. The diameter of the fuel cells can be slightly larger than that of the injector pins such that a narrow gap is formed when a fuel cell is mounted on an injector pin. Despite this narrow gap, no separate seal is needed to prevent gas leakage because the pressure drop through the narrow gap between the injector pin and the interior channel of the fuel cell is much higher than the pressure drop through the fuel cell itself. Thus, there is sufficient back pressure to minimize gas leakage from the interior channel of the fuel cell without the use of a separate seal. For example, a fuel cell with a 2.8 mm diameter can be mounted to an injector pin with a 2.5-2.7 mm diameter and the gap formed does not interfere with the operation of the fuel cell system. A person skilled in the art will appreciate that the central support element also can be similarly mounted on an injector pin on the fuel cell plate.

In certain embodiments, the fuel cell system can include an insulator plate located in proximity to the fuel cell plate. The fuel cells can pass through the insulator plate via various openings on the insulator plate. These openings can be fabricated at a diameter equal to or slightly smaller than the individual fuel cells, causing a tight fit between the fuel cells and the insulator plate. The insulator plate can be affixed to the fuel cell plate through chemical or physical means, such as by adhesives or friction. The resulting fuel cell plate/insulator plate assembly can produce an increased resistance to gas leakage due to a large pressure drop between the interior channel of the fuel cell and the area surrounding the fuel cell.

In some embodiments, the manifold cap can include a substantially hemispherical (i.e., dome) end. During operation of the fuel cells, as high-temperature gases circulate inside the manifold cap, thermal stress can be induced and a substantially hemispherical structure can help reduce the stress concentration inside the manifold cap. In other embodiments, the manifold cap can have a planar end surface. For example, the manifold can be shaped as a cylindrical cap. Due to its geometry, a cylindrical cap is likely to undergo thermal expansion during the operation of the fuel cell system. To reduce thermally induced stresses exerted at the intersection of the end surface and the cylindrical side walls, the cylindrical manifold cap can include a fillet around its edge. In further embodiments, in place of a separate manifold cap, the fuel cell stack can be inserted into a gas-impermeable insulation package such that a void space is provided distal to the fuel cell plate (i.e., between the fuel cell plate and the insulation package). Like the manifold cap, the void space provides a path for gases to pass from the central support element to the fuel cells, bringing them in fluid communication with each other.

The fuel cell stack typically includes a plurality of fuel cells disposed around the central support tube. The fuel cells used in the fuel cell system of the present teachings can be described as tubular anode-supported fuel cells. More specifically, the fuel cells can include an internal fuel electrode (i.e., the anode) serving as a support, an intermediate electrolyte, and an external air electrode (i.e., the cathode). The tubular anode support generally can define a hollow central bore (i.e., a channel). In other embodiments, the fuel cell may be cathode-supported, electrolyte-supported or substrate-supported. In terms of geometry, the tubular fuel cells can be cylindrically-shaped, or can be polygonal or of other shapes (e.g., elliptical). For example, the tubular fuel cells can have a substantially triangular shape with rounded vertices joining the three surfaces. In some embodiments, the anode can include one or more supporting features (e.g., bosses or elevations) protruding from its interior wall into the central bore as described in U.S. Pat. No. 6,998,187, the disclosure of which is incorporated by reference herein in its entirety.

Compositionally, the electrodes can be made from any suitable porous electrode materials known in the art. For example, the anode can be made from a ceramic material or a cermet material. The ceramic material or the ceramic component in the cermet material can include, for example, a zirconia-based material or a ceria-based material. Examples include, but are not limited to, stabilized zirconia (e.g., yttria-stabilized zirconia, particularly $(ZrO_2)_{0.92}(Y_2O_3)_{0.08}$) and doped ceria (e.g., gadolinium-doped ceria, particularly $(Ce_{0.90}Gd_{0.10})_{1.95}$). In the case of cermet materials, the metallic component can include one or more transition metals, their alloys, and/or physical mixtures. The metallic component (e.g., Ni, Co, Cu, Ag, and W) can be introduced in the form of an oxide or a salt (e.g., NiO, $Ni(NO_3)_2$), and can be present in a range from about 30.0 vol. % to about 80.0 vol. % based on the total volume of the cermet material. For example, the anode can be a porous nickel cermet with yttria-stabilized zirconia. Other suitable electrode materials include alumina and/or titanium oxide based ceramics that may or may not include a metallic component. Examples of suitable cathode materials include various perovskites such as, but not limited to, lanthanum manganite perovskite ceramics, lanthanum ferrite perovskite ceramics, praseodymium manganite perovskite ceramics, and praseodynium ferrite perovskite ceramics.

The electrolyte layer can be made from the same ceramic and cermet materials described above. Suitable metallic components in the cermet materials include, but are not limited to, Ni, Co, Cu, Ag, W, Pt, Ru, their alloys, and/or physical mixtures thereof. The metal content can range from about 0.1 vol. % to about 15 vol. %. In various embodiments, the electrolyte layer can be made from a doped ceramic. For example, a thin and dense layer of doped zirconia can be used as the electrolyte layer. The electrolyte layer and the cathode material can be deposited on the anode by various deposition techniques including, but not limited to, slip-coating, dip-coating, spray-coating, and printing. The different layers can be co-sintered or sintered sequentially following deposition.

Figure 3:
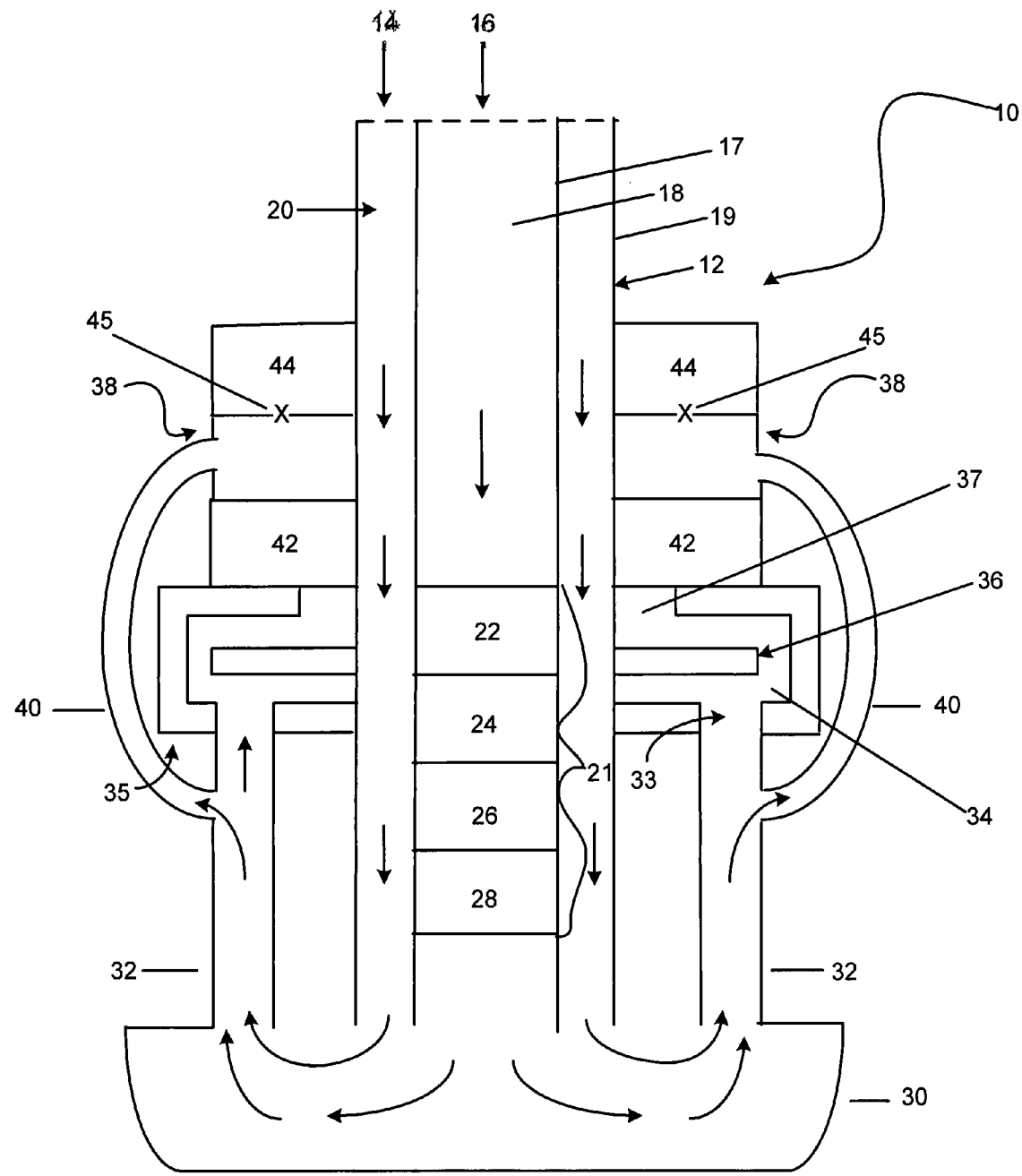
FIG. 3 is a cross-sectional view of an embodiment of a solid oxide fuel cell system according to the present teachings.

FIG. 3 is a more detailed cross-sectional view of the fuel cell system depicted in FIG. 1. The fuel cell system 10 including one or more fuel cells 32 and a central support element 12. The central support element 12 includes one or more oxidant inlets 14, one or more fuel inlets 16, a fuel element 17, a fuel channel 18, an oxidant element 19, and an oxidant channel 20. Other components of the fuel cell system include a fuel cell plate (not shown), a current collection assembly 35, and after burner 38, and an optional manifold 30. Fuel (e.g., a mixture of propane and air) enters the fuel cell system via the one or more fuel inlets 16 and is delivered to the anode of each of the fuel cells 32 via the fuel channel 18. An oxidant (e.g., air) enters the fuel cell system via the one or more oxidant inlets and is delivered to the cathode of each of the fuel cells 32 via the oxidant channel 20. As shown in FIG. 1, the one or more fuel cells 32 are disposed around the central support element 12.

Figure 4:
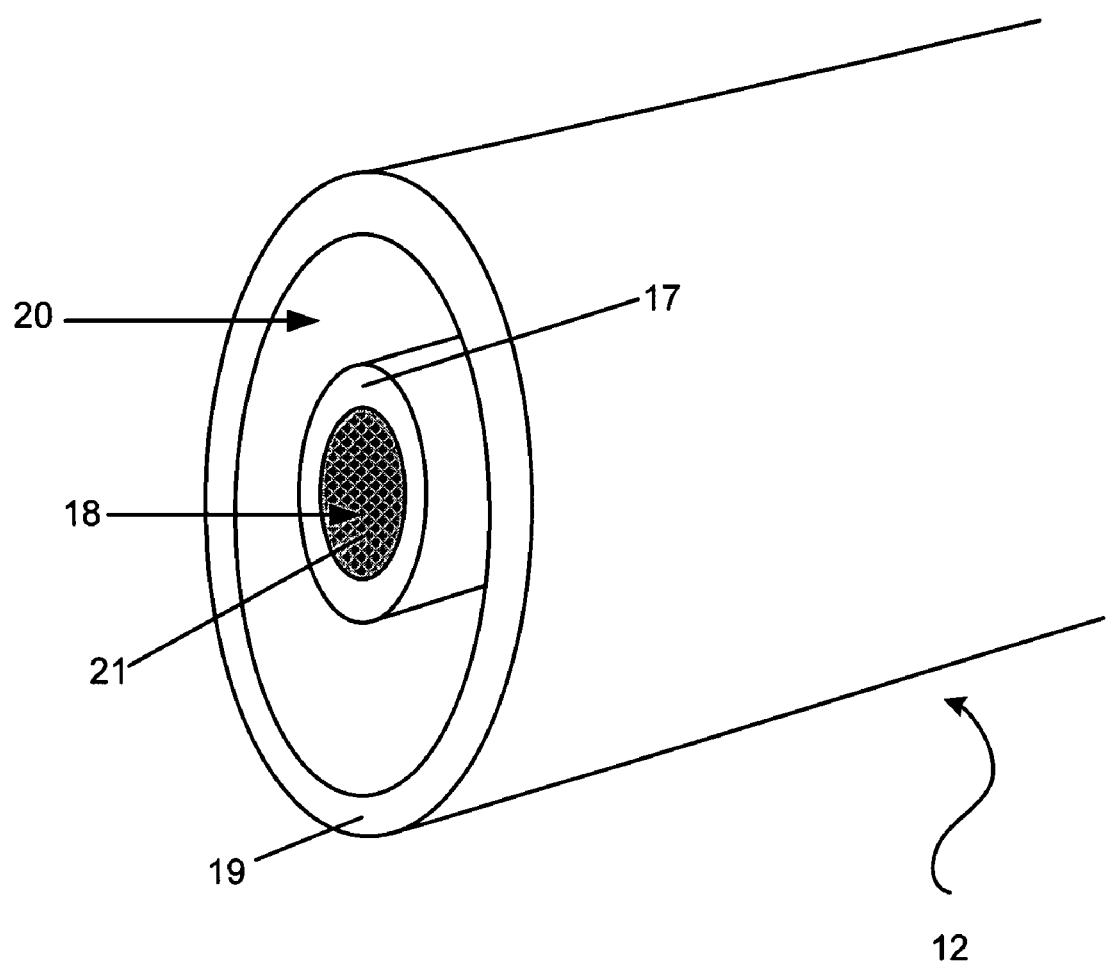
FIG. 4 is a schematic perspective view of an embodiment of a central support element according to the present teachings.

Referring to FIG. 4, the central support element 12 generally includes an inner longitudinal element 17 (also referred herein as a fuel element) and an outer longitudinal element 19 (also referred herein as an oxidant element). The outer longitudinal element can be concentric to and disposed around the inner longitudinal element. Each of these elements can be cylindrical or can have other geometric shapes (e.g., rectangular, polygonal, elliptical etc.). The inner longitudinal element 17 can define an inner longitudinal channel 18 (also referred herein as a fuel channel) which is adapted to deliver one or more fuels (e.g., a fuel mixture) to the anode of each of the one or more fuel cells, where the outer longitudinal element 19 can define an outer longitudinal channel 20 (also referred herein as an oxidant channel) which is adapted to deliver one or more oxidants to the cathode of each of the one or more fuel cells. In other words, the outer longitudinal channel is the annular space defined by the inner wall of the outer longitudinal element and the outer wall of the inner longitudinal element. The central support element typically also includes one or more fuel inlets and oxidant inlets for introducing fuel(s) and oxidant(s), respectively, into the fuel cell system. The inner longitudinal element and the outer longitudinal element can be composed of, for example, metal, a ceramic material (e.g., alumina), a semiconductor material, a polymeric material, glass, and mixtures thereof. To promote heat conduction between the inner longitudinal element and the outer longitudinal element, a heat conductive material can be placed between the inner longitudinal element and the outer longitudinal element to allow physical contact and direct heat transfer. For example, a heat conductive material can be placed along the inner wall of the outer longitudinal element and/or the outer wall of the inner longitudinal element. The heat conductive material can be a metallic (e.g., an alloy or a metal), or a ceramic material, and can be in the form of wire(s), mesh, foam or combinations thereof. An example of a heat conductive material is a wire coil made from Inconel® 600 (Special Metals Corp., Huntington, W.V.) that can have a square or round profile or a profile of other geometries.

Referring to FIG. 4, the central support element 12 can include one or more catalysts 21, including reforming catalysts that can function as a reformer if the fuel cell system is adapted to operate on fuels other than pure hydrogen. For example, hydrocarbon fuels such as natural gas, propane, gasoline, kerosene and diesel are less expensive, more easily and safely stored, and more readily available than hydrogen. Alcohols such as synthetic methanol and plant-derived ethanol also can be used. In some embodiments, the inner wall of the inner longitudinal element 17 can be fully or partially lined with one or more reforming catalysts 21. These catalyst(s) can be in the form of a coating, ceramic beads, and/or supported on or impregnated in a honeycomb catalyst bed (shown in FIG. 4). In some embodiments, the inner wall of the inner longitudinal element can be lined with a fiber wrap (e.g., a felt material) loaded with the catalyst(s).

In some embodiments, as shown in FIG. 3, the reforming catalyst(s) 21 disposed in the central support element can be a staged catalyst. The composition of the staged catalyst can vary depending on its location. This allows different catalytic reactions to take place as fuel passes through different sections of the inner longitudinal element. For example, the staged catalyst can include four different catalysts disposed in different catalyst sections along the inner longitudinal element. In particular embodiments, the catalyst in the first catalyst section 22 can be a low surface area partial oxidation reforming catalyst, followed sequentially by a second catalyst section 24 including a partial oxidation reforming catalyst or a combination partial oxidation and combustion catalyst, a third catalyst section 26 including a combustion catalyst, and a fourth catalyst section 28 including a steam reforming catalyst. The use of a staged catalyst permits fuel reforming at a larger temperature range, i.e., from about 200° C. to about 900° C., due to the different types of reforming reactions that are catalyzed by the different catalysts in the staged catalyst.

For example, in partial oxidation (POX) reforming, the fuel is partially oxidized with $O_2$ over a catalyst to produce carbon monoxide and hydrogen. The reaction is exothermic, but at the cost of a lower yield of hydrogen:

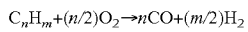

$$C_nH_m+(n/2)O_2 \rightarrow nCO+(m/2)H_2$$

Exemplary partial oxidation reforming catalysts include, without limitation, Pt, Ni, W, Ru, Au, Pd, Mo, Cu, Sn, Rh, and V. In some embodiments, the first partial oxidation reforming catalyst can include platinum and nickel oxides. This partial oxidation reforming catalyst can have a lower surface area (e.g., a reduced metal loading) compared to the later combination partial oxidation reforming and combustion catalyst, as most (e.g., 60%) of the fuel is expected to be reformed by the first catalyst section due to its proximity to the fuel inlet and the heat provided by the after burner. Because of this, the first partial oxidation reforming catalyst also needs to be more robust because all of the fuel injected into the fuel cell system will come into contact with the first catalyst section.

In certain embodiments, the second catalyst can be a high surface area partial oxidation reforming catalyst, the metal loading of which is typically higher than the first partial oxidation reforming catalyst. This is because, given that the second catalyst section is located further downstream from the first catalyst section, less fuel is available for reforming and therefore a higher surface area is required for effective reforming. In some embodiments, this second catalyst section can include nickel and platinum, with nickel at a higher ratio than platinum. For example, the ratio of nickel to platinum can range from about 5:1 to about 15:1. In some embodiments, the catalyst in the second catalyst section can be a mixture of a partial oxidation reforming catalyst and a combustion catalyst. The partial oxidation catalyst can be the high surface area partial oxidation catalyst described above. The combustion catalyst can be the combustion catalyst described below.

The combustion catalyst in the third catalyst section can be a metal catalyst, for example, a catalyst that includes one or more fuel metals selected from Pd, Pt, Cu, Mn, and Rh that promote fuel combustion. The heat generated by the combustion can be transferred to adjacent sections along the inner longitudinal channel where the second catalyst section and the fourth catalyst section are located, respectively, to initiate the partial oxidation reforming reactions enabled by these catalysts. Since the combustion catalyst operates at a lower temperature, the combustion catalyst will be the first catalyst in the four stage catalyst to start reforming the incoming fuel.

The fourth catalyst section can include a steam reforming catalyst and/or a partial oxidation reforming catalyst. Steam reforming produces carbon monoxide and hydrogen by catalysis of the following reaction:

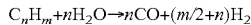

$$C_nH_m+nH_2O \rightarrow nCO+(m/2+n)H_2$$

The process is highly endothermic (i.e., occurring at temperatures in the range of about 700° C. to about 1000° C.) and consumes a considerable amount of energy which is typically supplied by external combustion. In the present fuel cell systems, the required thermal energy is supplied by the heat from the exothermic partial oxidation reforming and combustion reactions that occurred upstream. Exemplary steam reforming catalysts include various Group VIII metals such as, but not limited to, cobalt and nickel.

Referring to FIG. 2, after the fuel has passed through the catalysts 21, the reformed fuel and any unreformed fuel flows through a manifold 30 and is directed to the anode of one or more fuel cells 32. The fuel cells are generally tubular solid oxide fuel cells and can be electrically connected to form a fuel cell stack. As the fuel passes through the anode of the fuel cell some or all of the fuel will react with the oxygen ions to produce electricity and anode exhaust. The anode exhaust may contain carbon monoxide, carbon dioxide, water, any by-products of the reforming catalysts, unconsumed reformed fuel, and unconsumed, unreformed fuel. The anode exhaust is directed into the current collection assembly 35 through one or more anode outlet channel(s) 33, in fluid communication with both the anode(s) of the fuel cell(s) 32 and the current collection assembly 35.

The current collection assembly 35 can include a proximal wall, a distal wall, an inner wall, an outer wall, and an enclosed chamber defined by these walls in which one or more current collectors 36 are located. The current collection assembly can be of various shapes including, but not limited to, circular, elliptical, or other geometric or irregular shapes, and can further include an inner channel defined by its inner wall that extends between its proximal wall and its distal wall. The inner channel can be sized appropriately to allow the central support element to pass through and be inserted into the fuel cell stack.

In particular embodiments, the central support element 12, extends beyond the current collection assembly 35, can be inserted between the one or more fuel cells. The current collection assembly can be a slip fit (i.e., a friction fit) over the central support element. Accordingly, the current collection assembly can be moveable along the direction parallel to the axis of the fuel cells. The term "moveable" as used herein refers to the changing of relative position between the two subjects, such as the current collection assembly and the central support element. It also refers to the changing of relative position between a portion of one subject (e.g., the extension or retraction of a portion of a fuel cell such as the anode of a fuel cell) with another subject (e.g., the central support element). When attached to the one or more fuel cells, the combination of the current collection assembly and the one or more fuel cells similarly can slide along the central support element and can be easily removed from the system for maintenance or replacement.

During the operation of the fuel cell system, the combination of the current collection assembly and the one or more fuel cells can be expandable longitudinally as a result of the clearance between the central support element and the current collection assembly. This freedom of movement minimizes longitudinal compressive forces that may apply to the fuel cells and cause their premature failure. The central support element also can be removed from the stack independently, as the central support element can be a tight slip fit both into the current collection assembly and the fuel cell plate.

Referring again to FIG. 3, the current collector(s) 36 located inside the current collection assembly 35 are in electrical communication with the various fuel cell electrodes. The current collection assembly 35 can include openings on its distal wall that allow fluid communication with the anode outlet flow channel 33 of each of the one or more fuel cells.

In one embodiment, the current collection assembly can create a reducing environment, i.e., serve as a reducing chamber 34 or a chamber substantially free of oxygen, by directing only anode exhaust into the current collection assembly and channeling oxidant around the current collection assembly. Thus, this reducing chamber is not in fluid communication with the cathode of the fuel cells. Having the current collector(s) in a reducing chamber can reduce the risk of oxidation on the surface of the current collector(s), which often are made of metal(s) and/or alloy(s) that are susceptible to oxidation (e.g., silver). Undesirable oxidation reactions can cause damage and shorten the useful life of the current collector(s). A reducing atmosphere can provide other benefits. For example, in addition to permitting the use of alternative current collection materials that may otherwise oxidize and degrade in a high-temperature, oxygen-rich environment, the reducing atmosphere can eliminate the possibility of current collection failure resulting from the direct combustion of any unreacted or unconsumed fuel passing through the reducing chamber into the after burner.

The temperature of the reducing chamber also can be regulated by providing an insulator (not shown in FIG. 3) in thermal communication with the reducing chamber. The insulator can be disposed around the reducing chamber to limit the transfer of heat from the central support element and an after burner to the reducing chamber. Since current collector(s) are often made of metals, such as silver, the temperature in the reducing chamber should not exceed the melting point of the material of which the current collector is made. Therefore, a thermal insulator can be used, in conjunction with the air flow cooling, in order to regulate the temperature of the reducing chamber and the current collector.

With further reference to FIG. 3, the current collection assembly 35 also can include an opening 37 on its proximal wall that allows fluid communication with the after burner 38. The after burner can be located at the proximal end of the fuel cell system 10 adjacent to the current collection assembly 35, and can be disposed about the central support element 12 similar to the current collection assembly 35. Accordingly, any unconsumed fuel and exhaust exiting the anode(s) will be first channeled to the reducing chamber then to the after burner.

The after burner 38 generally is a chamber in which any unconsumed fuel can be combusted and consumed. To that end, the inner surface of the after burner can be at least partially coated with a combustion catalyst. In certain embodiments, the after burner can include a first combustion catalyst section 42 near its distal end and a second combustion catalyst section 44 near its proximal end. Openings are provided in the after burner between the first combustion catalyst section 42 and the second catalyst section 44, which bring the after burner in fluid communication with the cathodes of the one or more fuel cells 32 through one or more cathode outlet flow channel(s) 40. Any unreacted oxidant and/or oxidant exhaust is directed to and confined within an area between the first combustion catalyst section and the second combustion catalyst section in the after burner. The unreacted oxidant is mixed with the unconsumed fuel from the anode exhaust over the combustion catalysts disposed in the two combustion catalyst sections. The seal provided by the catalysts in the first combustion catalyst section help block off any backflow of unreacted oxidant into the current collection assembly and help maintain the reducing environment in the reducing chamber. The after burner catalysts also can have a catalyst doped fiber wrap (not shown). This fiber wrap serves as a gasket to prevent leakage of oxidant into the reducing chamber. Additionally, the first after burner catalyst also can prevent the oxidant in the after burner from entering the reducing chamber.

The after burner 38 also can include an igniter 45, for example, a glow plug, to initiate the combustion reaction. Additional functions and benefits of both the reducing chamber and the after burner will be described in more detail below in connection with the operation of the fuel cell system.

Regulating the temperature of the central support element can eliminate hot spots, or areas of high temperature, along the length of the central support element. Such temperature regulation can minimize premature catalyst failure, provide improved and more efficient fuel reforming, and minimize the thermal shock to the central support element.

The operation of the device will now be discussed in greater detail in two stages: start-up and normal operation.

Start-up. During startup of the fuel cell system, the fuel cell stack, i.e., the plurality of fuel cells, are at a temperature of about 30° C. At this somewhat cold temperature, the cold fuel travels unreformed through the central support element to the anode of the fuel cells. Because the fuel cells have not reached their operating temperature at this point, no power is generated, and the fuel will pass through the fuel cell system unconsumed. A similar relatively cold stream of oxidant travels through the central support element to the cathode of the fuel cells without reacting. The unreacted oxidant stream is then directly channeled from the cathode(s) through the cathode outlet flow channel(s) to the after burner. Meanwhile, the unreformed and unreacted fuel passes through the reducing chamber of the current collection assembly and to the after burner, where the fuel stream and the oxidant stream are combined and ignited by the hot igniter. The heat generated by the ignition of the fuel raises the temperature of the after burner to a temperature at which the after burner catalysts will begin catalysis. Thus, more fuel is combusted and more heat is produced. Most of this heat is transferred to the oxidant element which is immediately adjacent to the after burner, heating incoming oxidant. Heat transfer occurs between the oxidant element and the fuel element, and after the fuel in the fuel channel reaches a temperature of about or exceeding 180° C., the combustion catalyst in the third catalyst section can initiate combustion of incoming fuel. Heat generated by the combustion reaction is transferred to the neighboring catalyst sections (i.e., second and fourth catalyst sections) that contain partial oxidation reforming catalysts, steam reforming catalyst and optionally combustion catalysts. The partial oxidation catalysts can start to reform the fuel at about 800° C. After the temperature exceeds about 500° C. to about 700° C., the steam reforming catalyst will also begin reforming the fuel.

Normal Operation. After the central support element reaches its optimum operating temperature between around 800° C. to 900° C., all four of the catalysts in the four-stage catalyst in the central support element will reform fuel. During normal operation, the first catalyst (i.e., the partial oxidation reforming catalyst) reforms about 60% of the fuel. Any unreformed fuel then passes to the second and third catalyst sections, where about 30% of the incoming fuel is reformed. Finally, the remaining 10% of the incoming fuel is mostly reformed by the catalyst in the fourth catalyst section. Hence, by using the four-stage catalyst, a higher percentage of the fuel can be reformed and the start-up time of the fuel cell system can be decreased. For example, prior art fuel cell stacks can take up to one to two hours to start-up, whereas the fuel cell system of the present invention can reach 800° C. in less than about 20-25 minutes.

Additionally, because most of the fuel is reformed in the central support element and then consumed in the fuel cell stack, very little fuel will be combusted in the after burner. Therefore, the additional heat transferred from the after burner to the oxidant channel will be minimal at this stage of operation. Instead, the oxidant channel during operation is at about 600° C. Therefore, incoming oxidant through the oxidant channel actually helps to cool down the after burner as described in further detail below.

Because the fuel cells are positioned concentrically around the central support element and are in fluid communication with the central support element via the manifold, the heat transfer mechanisms provided by the central support element can help maintain the fuel cells at their appropriate operating temperatures. Once the fuel is reformed and the temperature of the fuel cells have increased to about 800° C., oxygen ions produced by the cathode(s) are transferred through the electrolyte material to react with the hydrogen on the anode(s), producing electricity.

As described above, partial oxidation reforming reactions are exothermic. Accordingly, heat produced in the fuel element by the reforming reactions can damage the catalysts and the fuel cell system as a whole if left unregulated. For example, the catalysts can start to melt, with the active metals in the catalyst sintering at around temperatures of about 900° C.-1100° C., and melting at temperatures of about 1100° C.-1400° C.

When the temperature of the catalysts and of the fuel element starts to increase, the oxidant channel, which can preheat the fuel element during startup, can serve to regulate and cool the temperature of the fuel element during operation. Just as before, heat transfer occurs between the fuel element and the oxidant element. However, because the temperature of the oxidant element during normal operation is actually lower than that of the fuel element (which can have a temperature of 900° C. or higher), heat is transferred from the fuel element to the oxidant element as opposed to being transferred from the oxidant element to the fuel element as in the start-up phase. The constant incoming flow of oxidant over the fuel element helps to cool the fuel element throughout its length, preventing the fuel element and the catalysts therein from overheating.

Similarly, because the stream of unconsumed oxidant and cathode exhaust passing through the oxidant channel will be cooler than the stream of unconsumed fuel and anode exhaust passing through the fuel channel, the cooler oxidant streams passing through the oxidant element and the cathode element also help to cool the anode channel and in turn, the current collector. By similar heat transfer mechanisms, the incoming oxidant stream through the oxidant element further cool down the current collection assembly and the after burner, both of which are disposed immediately adjacent to the oxidant element.

Shutdown: During shutdown, the gas flow rate and the electrical load on the fuel cell system are systematically reduced. The systematic reduction of the gas flow rate and the load on the fuel cell system can slowly bring the fuel cell stack temperature to below about 200° C. Once the stack temperature has dropped below 200° C., the gas flows can be switched off and the fuel cell stack is allowed to cool to room temperature.

Therefore, the dual-channel design of the central support element enables temperature regulation both during the start-up of the device, by transferring heat to the fuel element, and during operation by transferring heat from the fuel element.

Accordingly, another aspect of the present teachings relates to a method of operating a fuel cell system, for example, a fuel cell system having one or more fuel cells in fluid communication with a central support element and in electrical communication with a current collector as described above. The method can involve directing a fuel through a fuel element (which is part of the central support element) to the anode of each of the one or more fuel cells and an oxidant through an oxidant element (which also is part of the central support element) to the cathode of each of the one or more fuel cells. Because the temperatures of the fuel in the fuel element and the oxidant in the oxidant element can be different, a temperature differential can be created between the fuel element and the oxidant element. The temperature differential leads to a heat transfer (for example, by conduction) between the two elements and helps to maintain the two elements at the same temperature and protect the current collector from excessive heat.

The method also can include providing a current collector in a reducing chamber, where the reducing chamber is in fluid communication with an after burner. The method can include directing anode exhaust (which is substantially oxygen-free) from the anode through the reducing chamber to the after burner, where the anode exhaust is combusted with exhaust from the cathode (i.e., the cathode exhaust). The method can further include providing an insulating material between the reducing chamber and the after burner. The mechanisms provided in the central support element to enable thermal regulation can help regulate the temperature of the current collector inside the reducing chamber, as the whole fuel cell system is in thermal communication.

Other Embodiments

The present teachings can be embodied in other specific forms, not delineated above, without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

What is claimed is:

1. A fuel cell system comprising:
   one or more tubular fuel cells having a longitudinal axis, each comprising an anode, a cathode, and an electrolyte;
   a central support element in fluid communication with each of the one or more tubular fuel cells, wherein the central support element comprises an inner longitudinal element defining an inner longitudinal channel and an outer longitudinal element defining an outer longitudinal channel, wherein the outer longitudinal element is concentric to and disposed around the inner longitudinal element, wherein the inner longitudinal channel is adapted to deliver a fuel to the one or more anodes and the outer longitudinal channel is adapted to deliver an oxidant to the one or more cathodes, and wherein the one or more tubular fuel cells are disposed around the central support element;
   one or more anode outlet flow channels in fluid communication with the one or more anodes and adapted to direct an anode exhaust from the one or more anodes;
   one or more cathode outlet flow channels in fluid communication with the one or more cathodes and adapted to direct a cathode exhaust from the one or more cathodes;
   a current collection assembly disposed around the central support element comprising a reducing chamber in fluid communication with the one or more anode outlet flow channels and substantially free of any oxidant;
   a current collector disposed within the reducing chamber and in electrical communication with each of the one or more tubular fuel cells; and
   an after burner in fluid communication with the reducing chamber and the one or more cathode outlet flow channels, wherein the after burner is adapted to allow combination of the anode exhaust from the one or more anodes and the cathode exhaust from the one or more cathodes.

2. The fuel cell system of claim 1, wherein the central support element comprises one or more catalysts selected from a reforming catalyst, a combustion catalyst, and combinations thereof.

3. The fuel cell system of claim 2, wherein the central support element comprises a partial oxidation reforming catalyst.

4. The fuel cell system of claim 2, wherein the central support element comprises a steam reforming catalyst.

5. The fuel cell system of claim 2, wherein the central support element comprises a combustion catalyst.

6. The fuel cell system of claim 2, wherein the one or more catalysts are associated with at least a portion of an inner surface of the inner longitudinal element.

7. The fuel cell system of claim 2, wherein the catalyst comprises a four stage catalyst.

8. The fuel cell system of claim 7, wherein the four stage catalyst comprises a partial oxidation catalyst, a combination partial oxidation and combustion catalyst, a combustion catalyst, and a steam reforming catalyst.

9. The fuel cell system of claim 1, wherein the current collection assembly is in thermal communication with an insulating material.

10. The fuel cell system of claim 1, wherein the after burner comprises an inner surface at least partially coated with a combustion catalyst.

11. The fuel cell system of claim 1, wherein the after burner is disposed around the central support element.

12. The fuel cell system of claim 1, wherein an insulating material is present between the current collection assembly and the after burner.

13. The fuel cell system of claim 1, wherein the after burner comprises an igniter.

14. The fuel cell system of claim 1, comprising a fuel cell plate, wherein the fuel cell plate comprises one or more injector pins, and wherein a distal end of the one or more tubular fuel cells is mounted on the one or more injector pins without a seal.

15. The fuel cell system of claim 14, wherein a distal end of the central support element is attached to the fuel cell plate.

16. The fuel cell system of claim 14, wherein in current collection assembly is slip fit over the central support system.

17. The fuel cell system of claim 16, wherein the after burner is located proximal to the current collection assembly.

18. The fuel cell system of claim 16, wherein the proximal end of the one or more tubular fuel cells is attached to the current collection assembly, and wherein the combination of the current collection assembly and the one or more tubular fuel cells is moveable longitudinally during operation of the fuel cell system.

* * * * *